United States Patent [19]
Peters

[11] 3,912,537
[45] Oct. 14, 1975

[54] ELECTRIC STORAGE BATTERY GRIDS

[75] Inventor: Kenneth Peters, Worsley, England

[73] Assignee: Electric Power Storage Limited, London, England

[22] Filed: Mar. 7, 1974

[21] Appl. No.: 448,757

[30] Foreign Application Priority Data
Mar. 15, 1973 United Kingdom............12573/73

[52] U.S. Cl................ 136/26; 75/166 R; 75/166 B; 75/166 C; 75/166 D; 75/166 E; 136/65
[51] Int. Cl.²................................H01M 4/38
[58] Field of Search.......... 75/166 R, 166 B, 166 C, 75/166 D, 166 E; 136/65, 26

[56] References Cited
UNITED STATES PATENTS
2,148,741   2/1939   Gonser.............................. 75/166 C
2,620,367   12/1952   Brown.............................. 75/166 D

*Primary Examiner*—R. Dean
*Attorney, Agent, or Firm*—Oblon, Fisher, Spivak, McClelland & Maier

[57] ABSTRACT

An electric storage battery grid made from an antimonial lead alloy containing 0.002 percent to 0.5 percent of selenium with 0.25 percent to 0.5 percent arsenic and up to 4.0 percent antimony is disclosed. The alloy has improved casting properties for making the grid and the grids have a reduced tendency to release antimony in use.

9 Claims, No Drawings

ELECTRIC STORAGE BATTERY GRIDS

BACKGROUND OF THE INVENTION

1. Field of the Invention

The present invention relates to lead alloys in particular those suitable for use in making plate grids for lead acid electric accumulators, to such grids and to accumulators incorporating such grids.

2. Description of the Prior Art

Lead antimony alloys are known for use in preparing grids for lead acid electric accumulators. Pure lead is too weak and antimony is added to improve the strength and castability of the alloy. However, at concentrations of the order of above 4% there is a significant tendency for the antimony to be released from the grid into the electrolyte during service and on charging to be deposited on the spongy lead of the negative plate. This results in a reduction of the hydrogen over voltage and the local cells of lead and antimony set up on the negative plate also cause loss of charge on open circuit.

It is desirable to reduce the antimony content to as low as possible to reduce open circuit losses and to render the battery resistant to the bad effects of overcharging such as tend to occur with automotive batteries charged from alternating current sources, e.g. alternators.

SUMMARY OF THE INVENTION

According to the present invention the reduction in antimony content of a lead antimony alloy is compensated for by an addition of selenium and arsenic in certain amounts, such as to render the alloy castable in the form of thin grids e.g. 1.0 to 3.0 mms thick in a sufficiently strong and durable form for subsequent handling such as automatic pasting with active material.

Thus according to the present invention an electric storage battery grid is made from an alloy which comprises by weight antimony up to 4 percent, e.g., 0.1 to 4 percent preferably 1 percent to 3 percent; from 0.25 percent to 0.5 percent arsenic, preferably 0.25 to 0.4 percent; 0 percent up to 0.1 percent copper, e.g., 0.005 percent to 0.05 percent; 0 percent up to 0.5 percent sulphur, e.g., 0.0001 percent to 0.1 percent, e.g., 0.0002 percent to 0.001 percent or 0.01 or 0.05 percent; 0 percent up to 0.5 percent tin, e.g., 0.01 percent to 0.4 percent or 0.02 percent to 0.03 percent; and 0.002 percent up to 0.5 percent selenium, e.g., 0.003, 0.004 or 0.005 percent to 0.1 percent or 0.01 percent to 0.05 percent, the balance being lead, trace, elements, known optional alloy ingredients and impurities.

DETAILED DESCRIPTION OF THE PREFERRED EMBODIMENTS

The invention may be put into practice in various ways and a number of melt compositions from which grids can be cast will be described by way of example only and are set out in Table 1 below.

TABLE 1

| Alloy | Sb% | As% | Cu% | Sn% | Se% |
|---|---|---|---|---|---|
| | | | % added to melt based on total weight. | | |
| 1 | 3% | 0.4% | 0.05% | 0.4% | 0.5% |
| 2 | 3% | 0.4% | 0.05% | 0.4% | 0.05% |
| 3 | 3% | 0.4% | 0.05% | 0.4% | 0.01% |
| 4 | 1% | 0.4% | 0.05% | 0.4% | 0.5% |
| 5 | 1% | 0.4% | 0.05% | 0.4% | 0.05% |
| 6 | 1% | 0.4% | 0.05% | 0.4% | 0.01% |
| 7 | 1% | 0.25% | 0.02% | 0.02% | 0.5% |
| 8 | 1% | 0.25% | 0.02% | 0.02% | 0.05% |
| 9 | 1% | 0.25% | 0.02% | 0.02% | 0.01% |
| 10 | 3% | 0.25% | 0.02% | 0.02% | 0.5% |
| 11 | 3% | 0.25% | 0.02% | 0.02% | 0.05% |
| 12 | 3% | 0.25% | 0.02% | 0.02% | 0.01% |

The alloys may be made from virgin lead which typically comprises 99.9 percent lead, traces of copper and traces of sulphur (less than 0.0001) by the addition of antimony, arsenic, tin and selenium in which case very little copper is present in the cast grid.

Alternatively the alloys may be made from reclaimed lead acid battery scrap. This is made from scrap lead alloy from plate casting and defunct battery plates. The scrap which contains some lead sulphate and lead oxide is placed in a blast furnace and reduced to produce a molten metal typically containing 3.5 percent ($\pm$ 0.5 percent) antimony, 0.05 percent ($\pm$ 0.03 percent) arsenic, 0.075 percent ($\pm$ 0.025 percent) copper and tin, balance lead. This is placed in a steel pan and heated to 550°C and an approximately two fold excess by weight based on copper i.e., 0.15 percent ($\pm$ 0.05 percent) of elemental sulphur added. The mixture is stirred for 30 minutes at 550°C and the copper sulphide which rises to the surface skimmed off and discarded.

This lowers the copper content of the remaining metal to not more than 0.05 percent e.g. preferably 0.02 percent. Traces of copper sulphide may remain distributed through the melt. The sulphur content of a sample cast from this material is typically less than 0.001 percent e.g. 0.0002 percent to 0.0005 percent.

The metal is then mixed with the alloy ingredeints to bring it up to the desired composition. The metal is then cast at about 330°C in a cast iron mould the surfaces of which are dusted with cork powder to assist in proper filling of the mould cavity without premature freezing.

Preferred ranges of grid compositions are

| Antimony | 1.5 | to | 3.0% |
| Selenium | 0.005 | to | 0.02% |
| Arsenic | 0.25 | to | 0.4% |
| Tin | 0.02 | to | 0.06% |
| Copper | 0.02 | to | 0.04% |

The antimony is added to introduce maintenance-free characteristics to the battery systems. The selenium is added to modify grain structure and improve ductility and castability. The arsenic is added to increase the rate of hardening.

Six further alloys are described below in Table 2. The contents quoted are percentages by weight of the actual ingredients of the cast alloy.

TABLE 2

| Alloy | 13 | 14 | 15 | 16 | 17 | 18 |
|---|---|---|---|---|---|---|
| % Sb | 2.56 | 2.41 | 2.50 | 2.55 | 2.32 | 2.40 |
| % As | 0.05 | 0.27 | 0.36 | 0.45 | 0.47 | 0.49 |
| % Sn | 0.036 | 0.03 | 0.033 | 0.019 | 0.015 | 0.027 |
| % Cu | 0.013 | 0.011 | 0.028 | 0.029 | 0.029 | 0.032 |

TABLE 2-continued

| Alloy | 13 | 14 | 15 | 16 | 17 | 18 |
|---|---|---|---|---|---|---|
| % Se | 0.010 | 0.008 | 0.014 | 0.008 | 0.007 | 0.009 |
| % S | <0.001 | <0.001 | <0.001 | <0.001 | <0.001 | <0.001 |

Automotive positive and negative grids were cast with these melt compositions at 14.5 castings per minute for extended casting runs with no significant reductions in casting quality as the run progressed.

The lugs of the grids were then tested for hardness and rate of increase of hardness with age and the results are given in Table 3.

TABLE 3

| Alloy | 13 | 14 | 15 | 16 | 17 | 18 |
|---|---|---|---|---|---|---|
| Brinnel Hardness initially | 11.3 | 13.2 | 13.5 | 13.5 | 13.1 | 14.4 |
| 1 day | 12.5 | — | 14.5 | 14.2 | 13.9 | 14.9 |
| 2 day | — | — | 15.1 | — | — | — |
| 3 day | — | 15.3 | — | — | 15.1 | 15.8 |
| 4 day | 14.1 | 16.4 | 16.2 | 16.8 | — | — |
| 5 day | 14.7 | 16.4 | — | — | — | — |
| 6 day | 14.9 | — | — | — | 16.3 | 17.0 |
| 7 day | — | — | 17.6 | 18.0 | — | — |
| 8 day | — | — | — | — | — | — |
| 9 day | 15.2 | — | — | — | 17.5 | 18.1 |
| 10 day | — | 17.6 | 18.5 | — | — | — |
| 11 day | 16.0 | — | — | 18.6 | 18.5 | 19.0 |

The hardness was measured on a Vickers Hardness tester using a load of 4 kg. and 2 mm. diameter ball, i.e., $F/D^2 = 1$. The time of application of the load was ten seconds. As can be seen, the alloys with arsenic contents above 0.25 percent are harder initially and reach acceptable hardness levels, e.g., 15, more quickly.

Twelve further alloys are described below in Table 4. The contents quoted are percentages by weight of the actual ingredients in the cast alloy as determined by atomic absorption analysis.

TABLE 4

| Alloy | 19 | 20 | 21 | 22 | 23 | 24 |
|---|---|---|---|---|---|---|
| % Sb | 2.500 | 2.500 | 2.600 | 2.700 | 2.600 | 2.500 |
| % As | 0.270 | 0.070 | 0.310 | 0.060 | 0.310 | 0.060 |
| % Sn | 0.020 | 0.030 | 0.030 | 0.020 | 0.030 | 0.030 |
| % Cu | 0.020 | 0.020 | 0.020 | 0.010 | 0.020 | 0.020 |
| % Se | 0.006 | 0.008 | 0.008 | 0.012 | 0.008 | 0.008 |
| % S | <0.001 | <0.001 | <0.001 | <0.001 | <0.001 | <0.001 |
| | 25 | 26 | 27 | 28 | 29 | 30 |
| % Sb | 2.600 | 2.500 | 3.200 | 3.000 | 3.200 | 2.900 |
| % As | 0.310 | 0.070 | 0.310 | 0.070 | 0.310 | 0.070 |
| % Sn | 0.030 | 0.020 | 0.050 | 0.020 | 0.050 | 0.030 |
| % Cu | 0.020 | 0.020 | 0.020 | 0.020 | 0.020 | 0.020 |
| % Se | 0.008 | 0.008 | 0.009 | 0.012 | 0.009 | 0.008 |
| % S | <0.001 | <0.001 | <0.001 | <0.001 | <0.001 | <0.001 |

Alloys 19 and 20 were cast under identical conditions, namely, casting rate 15 castings per minute, lead pot temperature 380°C., lead pipe temperature 490°C., mould temperature 150°C., mould cooling water inlet temperature 23°C.

Alloys 21 and 22 were cast under identical conditions, namely, casting rate 15 castings per minute, pot temperature, mould temperature as alloys 19 and 20, lead pipe temperature 500°C., cooling water inlet temperature 13°C.

Alloys 23 and 24 were also cast under identical conditions as alloys 19 and 20, the casting rate being 12 castings per minute, cooling water inlet temperature 10°C. Alloys 25 and 26 were cast at 13 castings per minute under same conditions as alloys 19 and 20. Alloys 27 and 28 were cast at 14 castings per minute under the same conditions as alloys 19 and 20 with mould cooling water inlet temperature of 12°C. Alloys 29 and 30 were cast under same conditions as alloys 27 and 28 at 15 castings per minute.

The lugs of the grids cast as described above were then tested for hardness and rate of increase of hardness with age as described above and the results are given in Table 5 below.

TABLE 5

| Alloy | 19 | 20 | 21 | 22 | 23 | 24 |
|---|---|---|---|---|---|---|
| Initial Brinnel Hardness | | | | | | |
| 1 hour | 13.0 | 11.2 | 13.6 | 11.1 | 13.4 | 10.3 |
| 1 day | 13.8 | 13.0 | 14.7 | 13.0 | 15.7 | — |
| 2 days | 14.7 | 13.7 | 16.1 | 13.0 | 16.6 | — |
| 3 days | 15.9 | 14.9 | 16.6 | 14.7 | 17.2 | 13.6 |
| 6 days | 17.1 | — | 17.9 | 15.0 | 18.5 | 14.2 |
| 7 days | 17.4 | 15.8 | 18.9 | 16.6 | 18.4 | 15.1 |
| 8 days | 17.6 | 16.1 | 19.2 | 16.6 | 18.3 | — |
| 12 days | 18.4 | — | 19.7 | 17.4 | 19.2 | — |
| | 25 | 26 | 27 | 28 | 29 | 30 |
| 1 hour | 13.1 | 11.1 | 13.0 | 10.9 | 13.1 | 11.2 |
| 1 day | 15.4 | 13.3 | 14.3 | 13.0 | 14.7 | 13.8 |
| 2 days | 15.8 | — | 15.7 | 14.7 | 16.0 | 14.6 |
| 3 days | 16.6 | — | 16.5 | — | 16.5 | — |
| 6 days | 18.1 | 16.6 | 18.2 | 16.8 | 18.9 | 16.7 |
| 7 days | 18.6 | 16.9 | 18.5 | 17.7 | 19.0 | 16.4 |
| 8 days | 19.1 | 16.9 | 19.4 | 17.5 | 19.5 | 17.0 |
| 12 days | 19.4 | — | 19.4 | 17.5 | 19.1 | 17.2 |

As can be seen from Table 5, the alloys with arsenic contents of 0.25 percent and above have higher initial hardness values and reach acceptable hardness levels more quickly than those with arsenic contents below 0.25 percent.

The batteries having grids made from grid alloys in accordance with the present invention have substantially reduced water losses as can be seen from Table 6 below.

Alloy 31 had a composition within the following ranges:

Sb    5.80 – 6.40%
    As    0.15 – 0.20%
    Cu    0.01 – 0.04%
    Sn    0.01 – 0.05%

-continued
balance lead.

Alloy 32 had the following composition:

| | |
|---|---|
| Sb | 2.600% |
| As | 0.300% |
| Sn | 0.040% |
| Cu | 0.020% |
| Se | 0.009%, balance lead. |

TABLE 6

| No. of Completed Overcharge Units | Water Losses Per Cell Per 30 Hours Charge (ml.) | | | | | |
|---|---|---|---|---|---|---|
| | Alloy 31 | | | Alloy 32 | | |
| | 0°C. | 20°C. | 40°C. | 0°C. | 20°C. | 40°C. |
| 0 | 0.03 | 0.91 | 2.41 | 0.03 | 0.30 | 0.88 |
| 1 | 0.11 | 0.67 | 2.89 | 0.02 | 0.25 | 1.54 |
| 2 | 0.11 | 0.94 | 3.31 | 0.05 | 0.67 | 2.31 |
| 3 | 0.12 | 1.41 | 3.81 | 0.07 | 0.79 | 3.00 |
| 4 | 0.16 | 2.29 | 4.90 | 0.10 | 1.09 | 3.78 |

The temperatures quoted in Table 6 are the temperatures at which the overcharge cycles were carried out.

One overcharge unit comprises the following charge/discharge cycle.

The battery is charged at 4 amps constant current for 5 hours and then discharged at 4 amps for 1 hour and this is repeated 35 times at temperatures of 0°C, 20°C., and 40°C. The battery is then left on open circuit for 96 hours and then discharged at $3C_{20}$ rate at 40°C.

After each unit of overcharge on constant current the batteries were kept at the same temperature, i.e., 0°C., 20°C. or 40°C. and were re-charged on an alternator and the water losses quoted in Table 6 are measured during the alternator portion of the test.

The constant current portion of the test was an accelerated ageing sequence.

The alternator cycle was as follows:

The battery was discharged at a constant current discharge to 50 percent of its nominal capacity. The battery was then re-charged on a standard uncompensated Lucas type 15 ACR alternator for 30 hours.

This sequence was repeated until the batteries failed to give a 4-minute discharge to an end voltage of 7.98 volts on the $3C_{20}$ rate.

The batteries made from alloy 31 had both positive and negative grids made from alloy 31 and these were pasted with conventional positive paste (grid weight 64 grams, total pasted plate weight 565 grams) and conventional negative paste (grid weight 61 grams, pasted plate weight 567 grams).

The batteries made from alloy 32 had both grids made from alloy 32. The grid weights were 57 grams and 55 grams respectively and were pasted with the same pastes as for alloy 31 batteries to give total pasted plate weights of 565 grams and 595 grams.

The plates were then immersed in 500 ml. of 1.260 sp. gr. sulphuric acid and charged at 4 amps for 5 hours followed by 1 hour discharge at 16 amps repeated five times. They were then ready for testing.

Table 6 thus gives a measure of charging characteristics at varying battery ages.

Table 7 below gives the cumulative water losses for the tests shown in Table 6. The overcharge losses are the water losses during the alternator cycle which are quoted in column 1 and the open circuit losses (column 2) are those occurring during the 96 hour open circuit period.

TABLE 7

| Alloy | Column 1 Overcharge Losses | | | Column 2 Open Circuit Losses |
|---|---|---|---|---|
| | 0°C. | 20°C. | 40°C. | at 20°C. |
| | ml./cell/1,000 hours | | | ml./cell/1,000 hours |
| 31 | 1.7 | 19.9 | 75.1 | 0.8 |
| 32 | 3.5 | 38.1 | 113.1 | 1.4 |

We prefer not to use more than 0.5 percent arsenic since up to this level very good age hardening is achieved but above this level there is a tendency for the grids to crack on storage and this can interfere with automatic pasting. This tendency increases markedly at arsenic contents much above 0.5 percent.

When these alloys do not contain selenium, the problem of cracking again arises. However, with arsenic contents below 0.25 percent, the presence of selenium whilst overcoming cracking leaves the grids too soft for satisfactory mechanical handling as in automatic pasting.

It has been proposed in German Patent Specification No. 1,193,253 to improve the castability and corrosion resistance of lead antimony arsenic alloys by reducing the antimony content and increasing the arsenic content but this proposal teaches that success can only be achieved if the content of arsenide forming components is kept below certain levels.

Thus this proposal teaches that the selenium content must be kept to not more than 0.001 percent.

We have found to the contrary that selenium at 0.002 percent and above combined with arsenic contents of 0.25 percent and above produces excellent results.

German Auslegeschrift No. 2151733 discloses a lead antimony alloy for electric storage battery grids comprising 1.5 to 3.5 percent antimony, 0.025 to 0.2 percent arsenic, 0.01 to 0.05 percent tin, 0.005 percent to 0.1 percent selenium, balance lead. This alloy is described as having the required hardness, tensile strength and toughness for battery grids without the need for heat treatment, since heat treatment reduces the strength. The alloy is also described as enabling thin battery grids to be cast which have adequate corrosion resistance. The specification teaches that an arsenic content of 0.05 percent is preferred and that arsenic contents above this level interfere with the age hardening process. We have found that the alloys with only 0.05 percent arsenic have relatively low initial hardness and that it would be desirable for production purposes to be able to reduce the time required for the hardness to rise to an adequate level. Surprisingly, we have found that much improved hardness and increase of hardness with time is obtained when the arsenic content is in the range 0.25 percent to 0.5 percent, especially 0.25 to 0.4 percent.

What I claim as my invention and desire to secure by letters Patent is:

1. An electric storage battery grid made from an alloy consisting essentially of: 0.1 to 4 wt. percent antimony, 0.25 to 0.5 wt percent arsenic, up to 0.1 wt percent copper, up to 0.5 wt percent sulfur, up to 0.5 wt percent tin, 0.002 to 0.5 wt percent selenium, and the balance being lead, trace elements and impurities, wherein said amounts of selenium and arsenic cooperate to overcome cracking of said grid and maintain a satisfactory level of hardness while cooperating with antimony to achieve improved castability and corrosion resistance.

2. The grid as claimed in claim 1 in which the alloy contains 1 percent to 3 percent antimony.

3. The grid as claimed in claim 1 in which the alloy contains 0.25 percent to 0.4 percent arsenic.

4. The grid as claimed in claim 1 in which the alloy contains 0.02 percent to 0.05 percent copper.

5. The grid as claimed in claim 1 in which the alloy contains 0.02 percent to 0.4 percent tin.

6. The grid as claimed in claim 1 in which the alloy contains 0.01 percent to 0.5 percent selenium.

7. The grid as claimed in claim 1 in which the alloy contains
1.5 percent to 3.0 percent antimony,
0.005 percent to 0.02 percent selenium,
0.25 percent to 0.4 percent arsenic,
0.01 percent to 0.06 percent tin, and
0.01 percent to 0.04 percent copper.

8. The grid as claimed in claim 1 in which the alloy contains
2.3 percent to 2.6 percent antimony,
0.25 percent to 0.5 percent arsenic,
0.015 percent to 0.035 percent tin,
0.01 percent to 0.035 percent copper
0.005 percent to 0.015 percent selenium, and
less than 0.001 percent sulphur.

9. A lead acid electric accumulator in which the grids are as claimed in claim 1.

* * * * *